Aug. 28, 1945.  C. J. DAVIES  2,383,849
METHOD AND APPARATUS FOR MAKING SHEET MATERIAL
Filed March 11, 1940  6 Sheets-Sheet 1
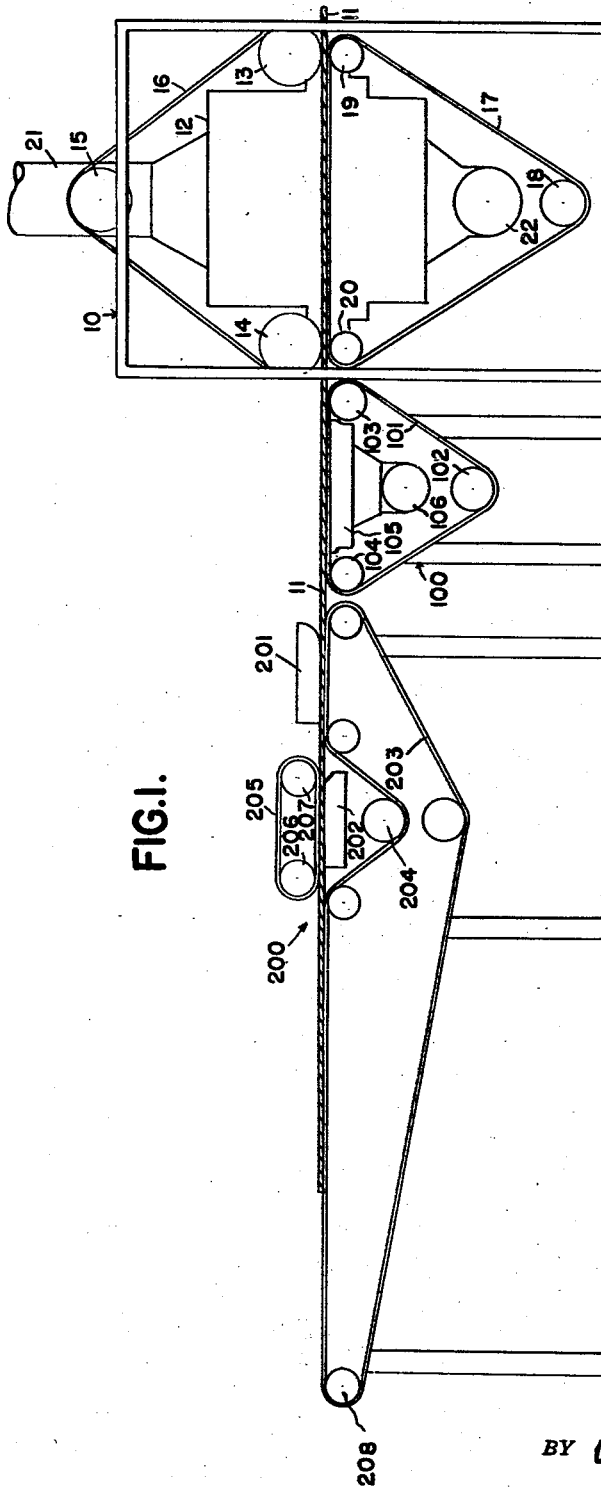
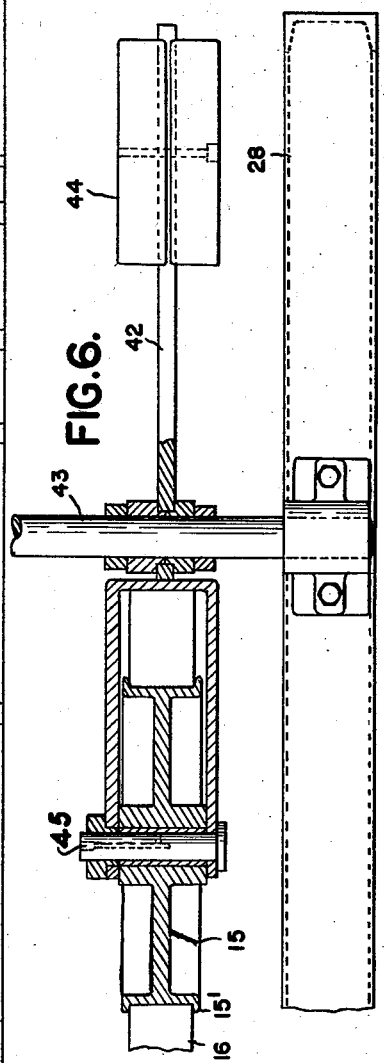
INVENTOR.
CLARENCE J. DAVIES
BY Whittemore, Hulbert
& Belknap
ATTORNEYS

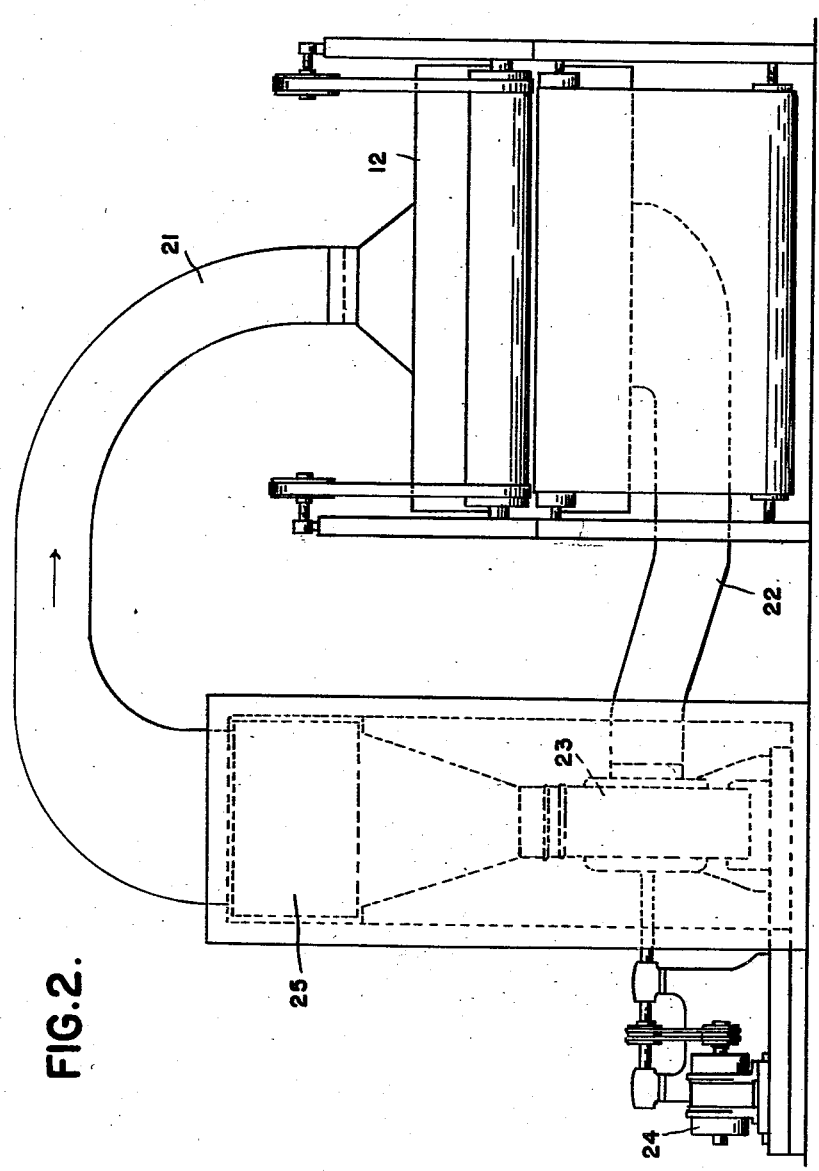

Aug. 28, 1945.  C. J. DAVIES  2,383,849
METHOD AND APPARATUS FOR MAKING SHEET MATERIAL
Filed March 11, 1940  6 Sheets-Sheet 3
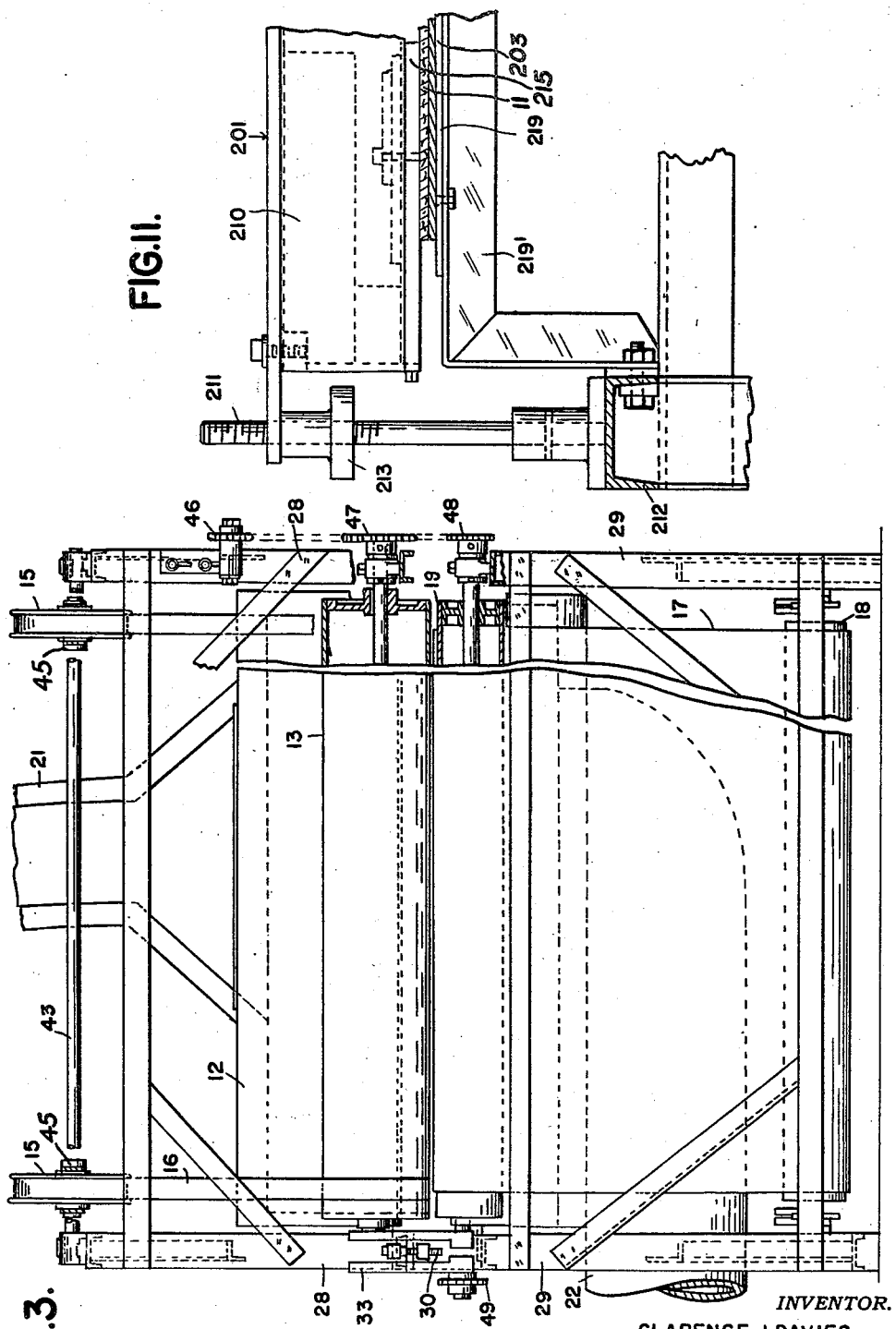

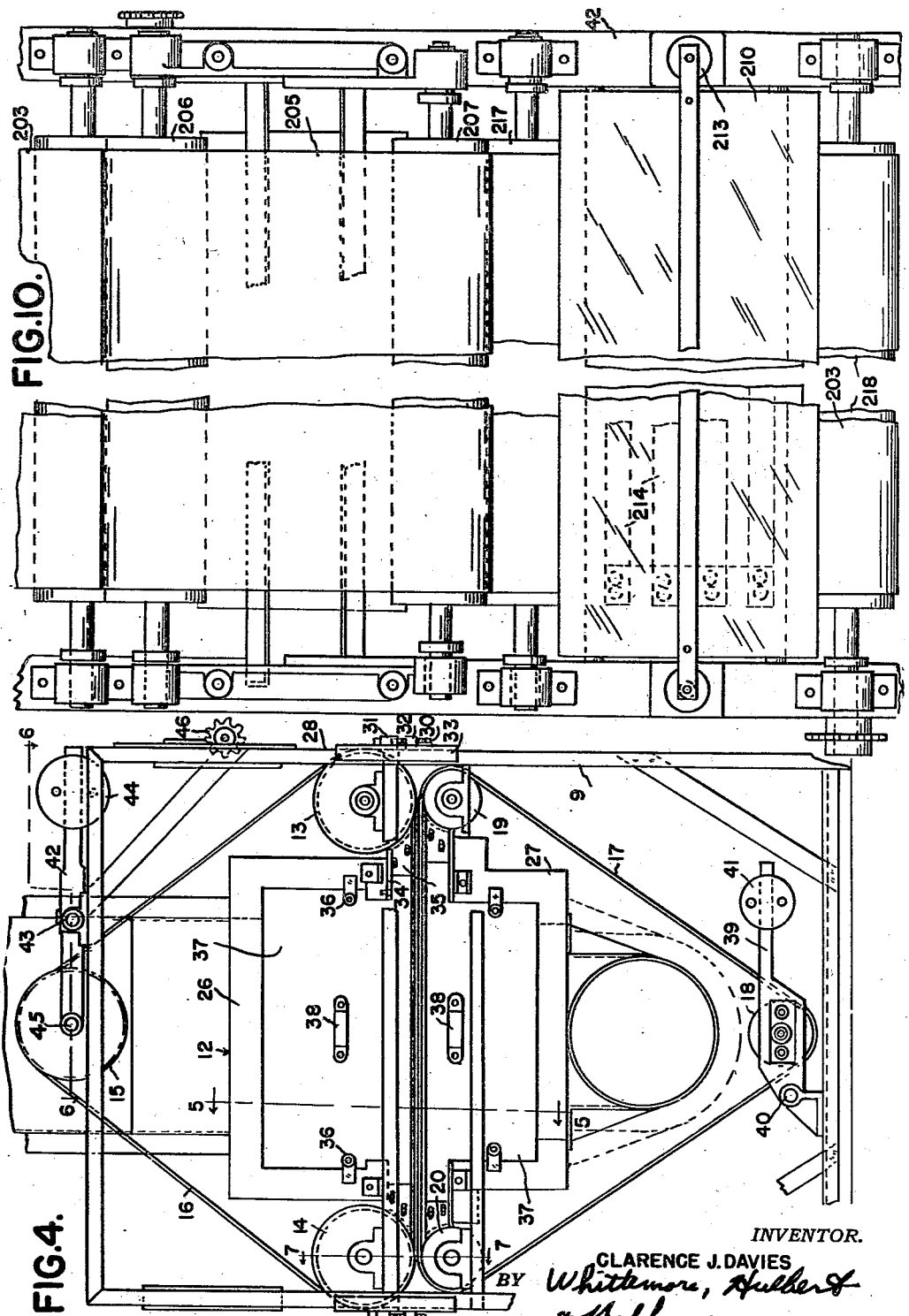

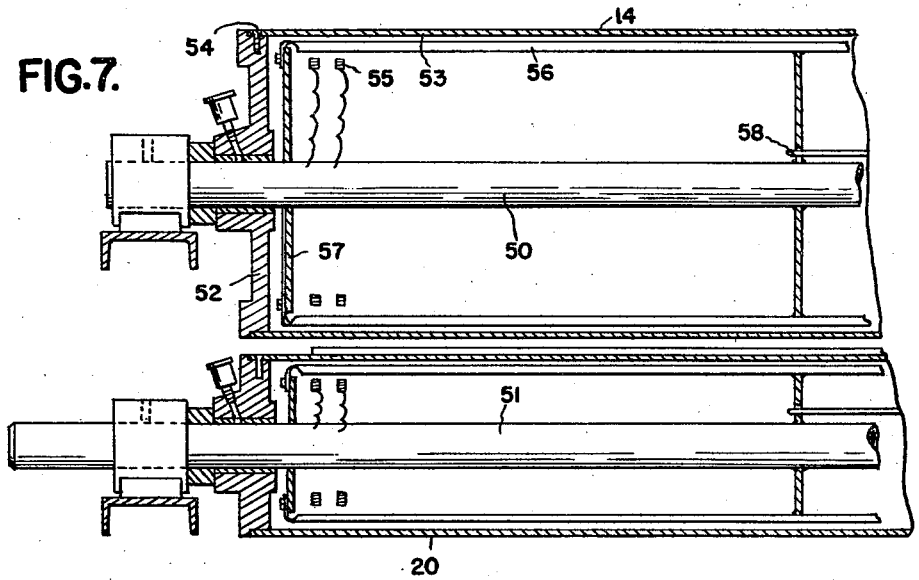
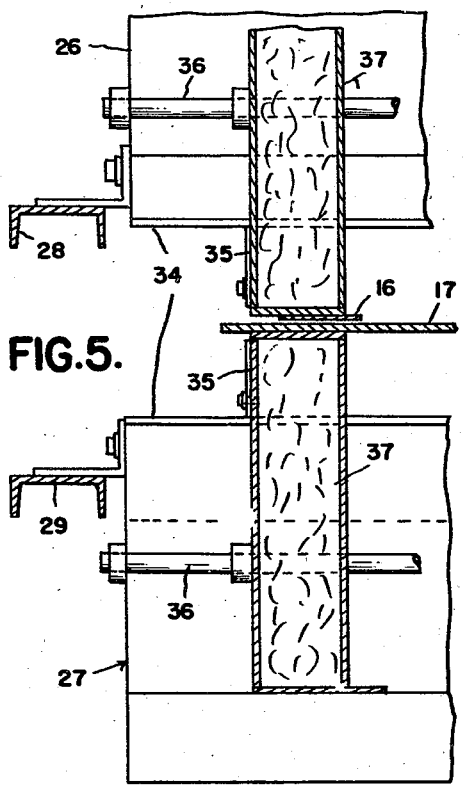
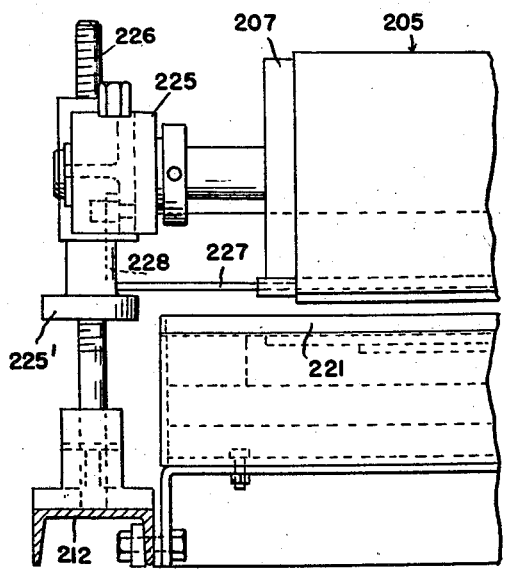

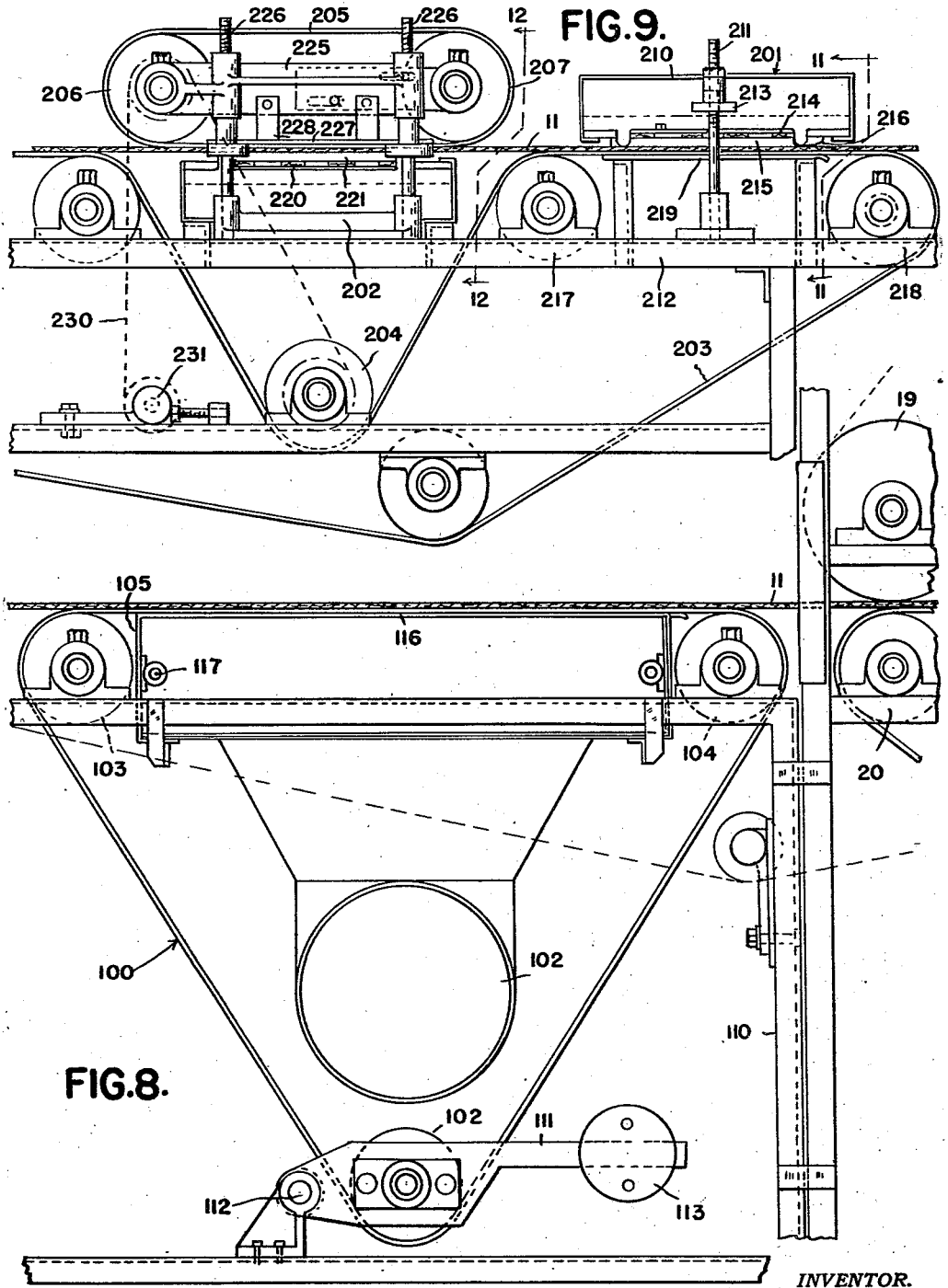

Patented Aug. 28, 1945

2,383,849

UNITED STATES PATENT OFFICE 2,383,849

METHOD AND APPARATUS FOR MAKING SHEET MATERIAL

Clarence J. Davies, Detroit, Mich., assignor to National Automotive Fibres, Inc., Detroit, Mich., a corporation of Delaware Application March 11, 1940, Serial No. 323,430

11 Claims. (Cl. 154—1)

The present invention relates to an improved apparatus and method for making sheet material.

According to the present invention a fibrous insulating material of sheet-like construction, having high insulating qualities and being comparatively soft and resilient while at the same time having surface characteristics such that it can withstand rough handling, is produced. Briefly described and according to the method at present preferred, the insulating material is produced by interspersing a dry, powdered thermoplastic binder substantially uniformly through a relatively thick web of loosely aggregated fibrous material, such for example as cotton. The web of fibrous material is heated by positively forcing heated air therethrough in a manner to soften the thermoplastic particles. Each thermoplastic particle serves to bind together the adjacent fibers with the result that the entire web has a multiplicity of zones wherein the fibrous materials are bonded together.

After softening of the thermoplastic material the web is compressed to the desired thickness, preferably leaving the same comparatively soft and resilient. Since the thermoplastic binder material is soft at this time, the web tends to remain at the thickness to which it was compressed. Further operations are performed to improve the surface of the web in a manner to increase its smoothness and its strength. These subsequent operations may take numerous forms, and in its simplest form comprises the step of smoothing the surface of the web while the thermoplastic binder is still in a soft or plastic condition. According to the preferred embodiment, the web after compression is cooled by circulation of cooling air therethrough and thereabout in a manner to cause the thermoplastic material to set. Subsequently the material is treated by providing sliding contact between one surface of the web and a smooth heated surface. This operation is referred to herein as "ironing" and serves the purpose of first softening the thermoplastic material adjacent the surface without softening the thermoplastic material within the body of the web. The sliding contact between the surface of the web and the surface of the ironing element smooths the surface and compacts the fibrous material at the surface without compacting the fibers in the interior of the web where the thermoplastic binder has already set.

With the foregoing general remarks in view, it is accordingly an object of the present invention to produce a new article of manufacture in the form of a fibrous sheet material having smooth, compacted surfaces.

It is a further object of the present invention to provide a sheet material composed of partly compressed fibrous material retained in compressed state by means of a binder and having surfaces substantially smooth and compacted and having an increased amount of binder therein.

It is a further object of the invention to provide a novel method for producing the before-mentioned product.

More specifically it is a further object of the present invention to produce fibrous material of the character described by a method which includes the steps of heating and smoothing the surface of a fibrous sheet material having a thermoplastic binder therein.

It is a further object of the present invention to provide novel apparatus for carrying out the herein described method and for producing the herein described product.

More specifically it is an object of the present invention to provide an apparatus for producing the product described, in which means are provided for advancing a web of fibrous material containing a thermoplastic binder in sliding contact past a heated smooth element for the purpose of smoothing or "ironing" the surface of the web.

It is a further object of the present invention to provide, in apparatus of the character described, a chamber for positively forcing heated air through an advancing fibrous web.

It is a further object of the present invention to provide an apparatus for producing the product described, which comprises means for continuously advancing a fibrous web containing a thermoplastic binder, means for compressing the web to a desired degree, means for causing the binder to set, and means effective thereafter for softening the binder through a shallow zone adjacent a surface of the web, in conjunction with means for smoothing the surface of the web.

Other objects of the invention will be apparent as the description proceeds, and when taken in conjunction with the accompanying drawings wherein:

Figure 1 is a more or less diagrammatic view illustrating the complete apparatus for treating the binder impregnated web;

Figure 2 is a diagrammatic view illustrating means for circulating heated air through a heating chamber;

Figure 3 is an end view partly in section of the heating chamber;

Figure 4 is an enlarged side elevation of the heating chamber;

Figure 5 is a section on the line 5—5 of Figure 4;

Figure 6 is a section on the line 6—6 of Figure 4;

Figure 7 is a section on the line 7—7 of Figure 4;

Figure 8 is an enlarged side elevation of the cooling device;

Figure 9 is an enlarged side elevation of the ironing structure;

Figure 10 is a top plan view of the ironing structure shown in Figure 9;

Figure 11 is a section on the line 11—11 of Figure 9; and

Figure 12 is a section on the line 12—12 of Figure 9.

Referring now to the drawings, and more particularly to Figure 1 thereof, 10 is a heating device for heating and softening the thermoplastic material dispersed in powdered form through the web 11 of fibrous material, and 12 is a sealing chamber which constitutes a part of said heating device. Rolls 13, 14 and 15 are provided for carrying bands or belts 16 adapted to contact the edges of the fibrous web and to seal the same. A foraminous conveyor belt 17 is carried by rolls 18, 19 and 20 for supporting the fibrous web and for permitting the forced circulation of heated air therethrough. Air from a blower 23 is forced through a conduit 21 to the sealing chamber 12 and returns through a conduit 22 to the blower 23. The fibrous web enters the chamber 12 between the rolls 13 and 19 and leaves the chamber between the rolls 14 and 20. Preferably the rolls 14 and 20 are close enough to each other to compress the web a desired degree.

After having been compressed to a desired degree the web passes next to a cooling device indicated generally at 100, which has a supporting conveyor belt 101 carried by rolls 102, 103 and 104. The belt 101 advances the fibrous material 11 over a box 105 connected to a suction conduit 106 adapted to draw air downwardly through and around the web 11 to cool the same and to cause the thermoplastic binder therein to set.

After cooling, the fibrous web 11 advances past a surfacing apparatus indicated generally at 200, which comprises a first ironer 201 and a second ironer 202. As the material advances beneath the first ironer 201 it is supported by suitable means, not shown in this figure, engaging a conveyor belt 203 which causes the fibrous material to be held in light but firm friction contact with the lower smooth surface of the ironer 201.

The conveyor belt 203 drops away from the plane of advance of the fibrous web 11 around a roll 204 to provide space for the second ironer 202. A second short conveyor belt 205 is mounted between rolls 206 and 207 which causes the fibrous material to be positively advanced in light but firm pressure contact against the upper surface of the heated iron 202. The completed material is advanced on the conveyor 203 toward the end roll 208 at which time it is in completely finished condition.

Referring now more particularly to Figure 2, I have illustrated the arrangement of parts which provides for the circulation of heated air through the heating chamber 12. As shown, the blower 23 is driven by a motor 24 and circulates air in the direction indicated by the arrows through the conduit 21 and the return conduit 22. Suitable means are provided between blower 23 and the conduit 21 for heating the air, and these means preferably take the form of an electric heating device indicated at 25. Obviously, instead of the electric heating device 25, a steam heater or the like could be substituted.

Referring now more particularly to Figures 3, 4, 5, 6 and 7, the heating chamber is made in two halves 26 and 27, carried by corresponding frame portions 28 and 29. As best seen in Figure 4, frame portions 28 and 29 are secured together by means of bolts 30 passing through cooperating lugs 31 and 32 carried by the separate frame portions. Preferably the frame elements are angle irons, and guiding elements 33 overlap the angle irons.

The lower frame portion 29 carries the rolls 19 and 20, and the upper frame portion 28 carries the rolls 13 and 14. As will be evident, vertical adjustment of the upper frame 28 relative to the lower frame 29 results in a corresponding adjustment between the spacing of rolls 13 and 19 on the one hand and 14 and 20 on the other hand.

The heating chamber 12 is preferably of double wall sheet metal construction having insulating material of any suitable type therebetween. Means are provided for insuring that all of the air passing through the conduits 21 and 22 must pass through and not around the fibrous web 11.

In Figures 4 and 5 I have shown adjustable plates 34 which may be moved into exact registry with the various rolls. Preferably the sealing cooperating with each of the rolls 13, 14, 19 and 20 are identical, hence reference numerals are applied only to those cooperating with the roll 13. End plates 35, having one surface curved in conformity to the curvature of the rolls, are also provided, and are adjustable toward and away from the rolls. As will be evident, by adjustment of the plates 34 and 35, escape of air from the chamber 12 is thus effectively prevented.

In Figures 4 and 5 I have shown transversely extending rods 36 which extend across the heating chamber 12 and on which end closures 37 are slidably mounted. Handles 38 are provided on the slidable end closures 37 for convenient adjustment thereof. It is desirable to adjust the end closures 37 to correspond to different widths of fibrous web being treated. The end closures 37 cooperate with the bands 16 previously referred to to prevent escape of air around the side edges of the fibrous web 11 as it advances. By this means all of the air is positively forced through the fibrous web with the result that the thermoplastic binder therein will be uniformly softened throughout, and this can be accomplished with the fibrous material advancing at a substantial rate through the heating chamber. As will be evident, if reliance were placed upon penetration of the heated air into the fibrous web without positively forcing the air therethrough, a substantially greater interval of time would be necessary to soften the thermoplastic binder in the interior of the web.

The foraminous conveyor 17, passes around the lowermost roll 18 and is retained thereby at a desired degree of tension. For this purpose the roll 18 is mounted for free rotation on a lever 39, pivoted as indicated at 40 and having a weight 41 secured thereto. In like manner the bands 16 are retained under a desired degree of tension by means of the upper rolls 15, which are carried by levers 42 pivoted to a shaft 43, and having weights 44 carried thereby. Preferably the rolls 15 are provided with side flanges 15' for guiding the bands 16.

As indicated in Figure 3, the upper rolls 15 are mounted on a shaft 45, and they may be adjusted thereon to accommodate different widths of fibrous web. As previously stated the bands 16 cooperate with the adjustable end closures 37 to seal the interior of the heating chamber 12, and both are adjustable to accommodate different widths of web.

In the manufacture of the product, it is preferred to associate the mechanism herein disclosed with a Garnett of conventional type, provided with means for depositing powdered or comminuted thermoplastic binder. The Garnett, as is well known, is provided with a conveyor, and conveniently the drive for the apparatus herein illustrated may be taken from the Garnett. For example, a chain from the Garnett drive may lead over the chain tightening sprocket 46 and around the sprockets 47 and 48, which are secured in driving relation to the rolls 13 and 14 respectively. Sprockets 47 and 48 are of such diameter that the surface speeds of the rolls 13 and 14 are the same. In Figure 3 I have illustrated a second sprocket 49 carried at the opposite end of the drive shaft for the roll 14, and this sprocket may be connected by a separate chain for driving conveyors 101, 203 and 205 in timed relation.

As previously stated, the spacing of the rolls 13 and 14 on the one hand and 19 and 20 on the other hand are accomplished by means of bolts 30. When the fibrous web passes between the rolls 13 and 19 it is substantially compressed, and these rolls therefore serve the function of sealing rolls to prevent the escape of heated air therebetween as the fibrous material is fed into the chamber 12. Immediately after the fibrous material has passed the rolls 13 and 19 it regains substantially its initial thickness due to the fact that at this time the binder has not been softened by heat. When the material passes between the rolls 14 and 20, however, the binder material is softened so that the fibrous web tends to retain substantially the thickness to which it is compressed between rolls 14 and 20. These rolls may therefore be considered as gauge rolls for determining the thickness of the finished sheet material. Preferably the gauge rolls 14 and 20 are heated so that the softened thermoplastic material will not adhere thereto. In Figure 7 I have illustrated the rolls 14 and 20 as mounted on shafts 50 and 51 respectively. Referring first to the roll 14, circular end plates 52 are provided and the surface of the roll is formed by a cylindrical shell 53 removably secured in suitable recesses in the plates 52 and secured therein as indicated at 54. Heating elements 55 are indicated in Figure 7, and these may be electrical, steam, or other types, but for convenience it is preferred to employ electrical heating elements. The electric heating elements are mounted within separate cylindrical elements 56 carried by end closure plates 57. At 58 I have indicated the thermosensitive of a thermostatic control. Construction of the lower roll 20 and its heating element is substantially identical, and will not be separately described.

As best seen in Figure 8, the web 11 is advanced between the rolls 14 and 20 and is fed past a cooling apparatus generally indicated at 100. The cooling apparatus comprises a frame 110 which supports the rolls 102, 103 and 104. The roll 102 is arranged to provide a desired degree of tension in the foraminous belt 101, and for this purpose is carried by a lever 111 which is pivoted as indicated at 112 and which carries a weight 113 adjacent one end thereof. Carried by the frame 110 is a box 105 which has a multiple of apertures closely spaced throughout its upper surface 116. Preferably the side walls of the box are laterally adjustable on suitable rods indicated generally at 117 for the purpose of restricting the admission of air to portions of the upper surface 116, which are covered by the advancing web. A conduit 102 is provided, and a suitable associated fan, not shown, is placed therein. By this arrangement room air is drawn downwardly into the box 105 and will cause the plastic binder material and the web 11 to set. While provision of this cooling apparatus is not strictly necessary, it is preferred for the reason that it produces a product having substantial advantages, as will subsequently be pointed out.

Referring now more particularly to Figure 9, I have illustrated the ironing apparatus as comprising an upper ironer 201 and a lower ironer 202. The ironer 201 comprises a box 210 supported at its ends by a pair of uprights 211 carried by the frame 212. Suitable threaded adjusting means 213 are provided for varying the height of the ironer 201. The box 210 is provided with insulating material and carries heating elements indicated generally at 214. Carried at the lower side of the box 210 is the ironing element 215, which preferably is a highly polished, smooth metal plate having a rounded end 216. The conveyor belt 203 intermediate the rolls 217 and 218 is supported by a plate 219 so that the fibrous material 11 as it is advanced underneath the ironing element 215 is retained in firm but light pressure contact therewith. The plate 219, as best seen in Figure 11, is carried by an angle iron 219', bolted or otherwise secured to the frame 212. Preferably the temperature of the ironing element 215 is automatically kept constant and at such a level that the thermoplastic material at the upper surface of the web 11 and to a shallow depth therein is again softened. It will be recalled that at this time the thermoplastic material has been hardened or set by passing through the cooling apparatus 100. The pressures employed are sufficient to compress the fibrous material through the heated zone in which the thermoplastic material has again been softened. The major body portion of the fibrous material in which the thermoplastic binder is not again softened by the ironing element 215 is not substantially compressed. It is found that this operation gives a much smoother surface to the completed material than would otherwise be possible, and in addition it substantially strengthens the surface. The reason for this is readily apparent when it is considered that the surface produced by this operation comprises what might be called a thin shell of substantially compressed fibrous material having the thermoplastic binder concentrated therein due to the compression of the surface layer.

After the material has advanced past the first ironer 201 it then passes the second ironer 202, which is substantially identical. The ironer 202 has heating elements 220, identical with the heating element 214 carried in the box 210 of the first ironer 201. An ironing element 221 is carried in heat transfer relation to the heating elements 220 and is heated thereby. Ironing element 221 is identical with the element 215 previously described.

Means are provided for applying a predetermined light pressure to the fibrous material 11 as it passes the second ironer 202 and this comprises the rolls 206 and 207 and a conveyor belt 205 therebetween. The rolls 206 and 207 are supported by a frame 225, adjustably carried by the uprights 226 located at opposite sides of the advancing web. Vertical adjustment of the frame 225 is provided for by threaded adjusting means 225', threaded onto the uprights 226. Vertical adjustment of the frame 225 varies the pressure which may be applied to the fibrous material. The frame 225 carries a depending plate 227 by suitable brackets 228 and the plate 227 contacts the belt 205 which is advanced at the same speed as the fibrous material 11. In Figure 9 a chain drive for the roll 206 is indicated at 230, the chain passing around a suitable tightening sprocket 231.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. The method of making sheet material which comprises providing a sheet of loosely aggregated fibrous material having a thermoplastic binder therethrough, and ironing a surface of said sheet without compacting the body of said sheet by slidingly engaging said surface with a smooth heated surface.

2. The method of making a sheet material which comprises producing loosely aggregated fibrous material in sheet form having a set, thermoplastic binder therein, and ironing a surface of said sheet without compacting the body of the sheet by slidingly engaging said surface with a smooth heated ironing element.

3. The method of making a sheet material which comprises distributing particles of a thermoplastic binder throughout a sheet of loosely aggregated fibrous material, heating said particles to soften the same, compressing said sheet to desired thickness while said particles are soft, setting said thermoplastic binder, and ironing the surfaces of said sheet without compacting the body of the sheet by slidingly engaging the surfaces of the sheet with smooth heated ironing elements.

4. The method of making a sheet material which comprises distributing particles of a thermoplastic binder throughout a sheet of loosely aggregated fibrous material, heating said particles to soften the same, compressing said sheet to desired thickness while said particles are soft, setting said thermoplastic binder, and alternately ironing opposite surfaces of said sheet without compacting the body of the sheet by slidingly engaging opposite surfaces of the sheet alternately with heated ironing elements.

5. Apparatus for forming sheet material of the kind described comprising means for advancing a web of loosely aggregated fibrous material having a thermoplastic binder therein, means for heating and softening said binder, means for compressing said sheet material to desired thickness, means for cooling and setting said binder, ironing means for thereafter slidingly engaging one surface of said sheet material to compact and smooth said surface without compacting the body of said sheet.

6. The method of making fibrous sheet material having a compressed relatively soft and resilient body provided with ironed smooth compacted surfaces; comprising the steps of interspersing a dry powdered thermoplastic material substantially uniformly through a relatively thick layer of loosely aggregated fibrous material, heating the layer containing the thermoplastic material to soften the thermoplastic material and transform it into a resilient binder for the fibrous material, compressing the heated layer to provide a sheet having a compressed relatively soft and resilient body of predetermined thickness, cooling the sheet to cause the thermoplastic material in the body thereof to set, and ironing the surfaces of said cooled compressed sheet without compacting the body of the sheet to provide the relatively soft and resilient body with smooth compacted surfaces.

7. The method of making fibrous sheet material having a compressed relatively soft and resilient body provided with ironed smooth compacted surfaces; comprising the steps of interspersing thermoplastic material substantially uniformly through a relatively thick layer of loosely aggregated fibrous material, heating the layer containing the thermoplastic material to soften the thermoplastic material and transform it into a resilient binder for the fibrous material, compressing the heated layer to provide a sheet having a compressed relatively soft and resilient body of predetermined thickness, and ironing the surfaces of said compressed sheet without compacting the body of the sheet to provide the relatively soft and resilient body with smooth compacted surfaces.

8. The method of making fibrous sheet material having a compressed body provided with ironed smooth compacted surfaces; comprising the steps of interspersing a dry powdered thermoplastic material substantially uniformly through a relatively thick layer of loosely aggregated fibrous material, heating the layer containing the thermoplastic material to soften the thermoplastic material and transform it into a resilient binder for the fibrous material, compressing the heated layer to provide a compressed sheet of predetermined thickness, and ironing the surfaces of said compressed sheet without compacting the body of the sheet to provide the relatively soft and resilient body with smooth compacted surfaces.

9. The method of making fibrous sheet material having a compressed relatively soft and resilient body provided with ironed smooth compacted surfaces; comprising the steps of interspersing a dry powdered thermoplastic material substantially uniformly through a relatively thick layer of loosely aggregated cotton fibers, forcing heated air through the layer containing the thermoplastic material to soften the thermoplastic material and transform it into a resilient binder for the cotton fibers, compressing the heated layer to a predetermined thickness, and ironing the surfaces of said compressed sheet by providing sliding contact between the surfaces of the sheet and heated ironing elements to compact and smooth the surfaces of the sheet without compacting the body or interior of the sheet between said surfaces.

10. The method of making fibrous sheet material having a compressed relatively soft and resilient body provided with ironed smooth compacted surfaces; comprising the steps of interspersing a dry powdered thermoplastic material substantially uniformly through a relatively thick layer of loosely aggregated fibrous material, heating the layer containing the thermoplastic material to soften the thermoplastic material and transform it into a resilient binder for the fibrous material, compressing the heated layer to provide a sheet having a compressed relatively soft and resilient body of predetermined thickness, cooling the sheet to cause the thermoplastic material in the body thereof to set, and providing sliding contact between the surfaces of the sheet and heated ironing elements to compact and smooth the surfaces of the sheet without compacting the body or interior of the sheet between said surfaces where the thermoplastic material has already set.

11. In apparatus of the class described, a conveyor for advancing a sheet of resinated fibrous material in a substantially horizontal direction, staggeredly arranged ironing elements at longitudinally spaced points of the conveyor and adapted to be slidingly engaged alternately by the upper and lower surfaces respectively of the sheet as it is advanced, a portion of said conveyor being spaced in such close parallel relation to the ironing element engageable by one surface of said sheet that said element will iron said surface without compacting the body of the sheet as the latter is advanced by said conveyor past said element, another portion of said conveyor being by-passed around the second mentioned ironing element engageable by the other surface of the sheet, and an auxiliary conveyor for advancing the sheet past the second mentioned ironing element, a portion of the auxiliary conveyor being spaced in such close parallel relation to the second mentioned ironing element that said element will iron the other surface of said sheet without compacting the body of the sheet as the latter is advanced by the second conveyor past said second mentioned element.

CLARENCE J. DAVIES.